United States Patent
Voss

(10) Patent No.: US 7,331,361 B2
(45) Date of Patent: Feb. 19, 2008

(54) PRESSURE RELIEF VALVE WITH DIRECT HYDRAULIC DAMPING

(76) Inventor: Wolfgang Voss, Heinrich-Lübke-Strasse 13, Schwerte (DE) 58239

( * ) Notice: Subject to any disclaimer, the term of this patent is extended or adjusted under 35 U.S.C. 154(b) by 153 days.

(21) Appl. No.: 11/045,145

(22) Filed: Jan. 31, 2005

(65) Prior Publication Data

US 2005/0173005 A1    Aug. 11, 2005

(51) Int. Cl.
F16K 15/02     (2006.01)
F16K 17/04     (2006.01)
F16K 21/10     (2006.01)

(52) U.S. Cl. .................. 137/538; 137/512.3; 137/540; 137/860; 137/514; 251/337

(58) Field of Classification Search ............... 137/538, 137/514–514.7, 540, 860, 512.3
See application file for complete search history.

(56) References Cited

U.S. PATENT DOCUMENTS 3,344,806 A   10/1967   Schultz
4,176,680 A   12/1979   DeLaunay
4,699,171 A   10/1987   Sugden
5,285,813 A * 2/1994   Quante et al. .............. 137/494

FOREIGN PATENT DOCUMENTS

DE   1650299    9/1970
DE   19946848   4/2001
GB   1037327    7/1966

* cited by examiner

Primary Examiner—Ramesh Krishnamurthy
(74) Attorney, Agent, or Firm—Jamds Creighton Wray; Clifford D. Hyra

(57) ABSTRACT

To protect hydraulic assemblies, in particular to protect hydraulic brace systems, pressure relief valves 1 are used, the closing part 10 of which is formed by a piston 15, which is connected to the connection 4, and the valve spring retainer 12, which comprises said piston, is arranged displaceably thereon and accordingly has a cylindrical design. Between the connection 4, which is equipped with a blind hole 5 and radial bores 6, 7, and the displaceable closing part 10 and/or the correspondingly shaped valve spring retainer 12 a damping chamber 20 is formed, which is directly connected to the blind hole 5 and hence to the system pressure.

20 Claims, 4 Drawing Sheets

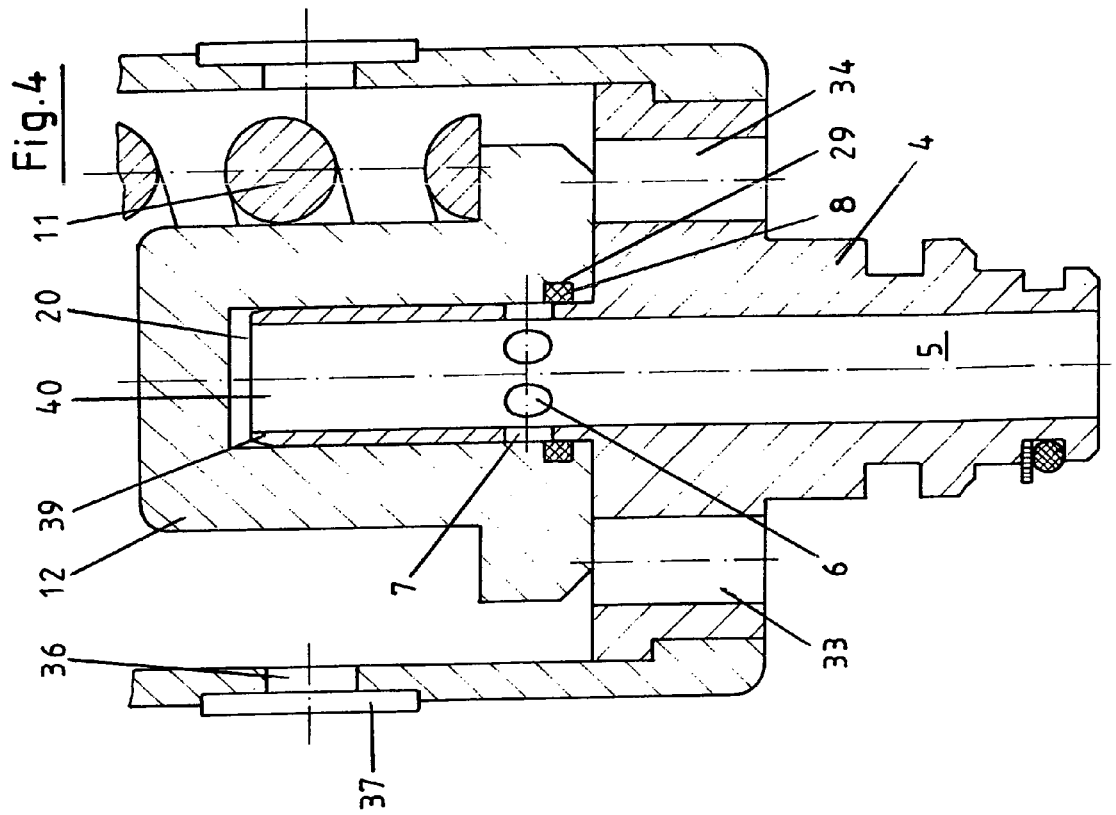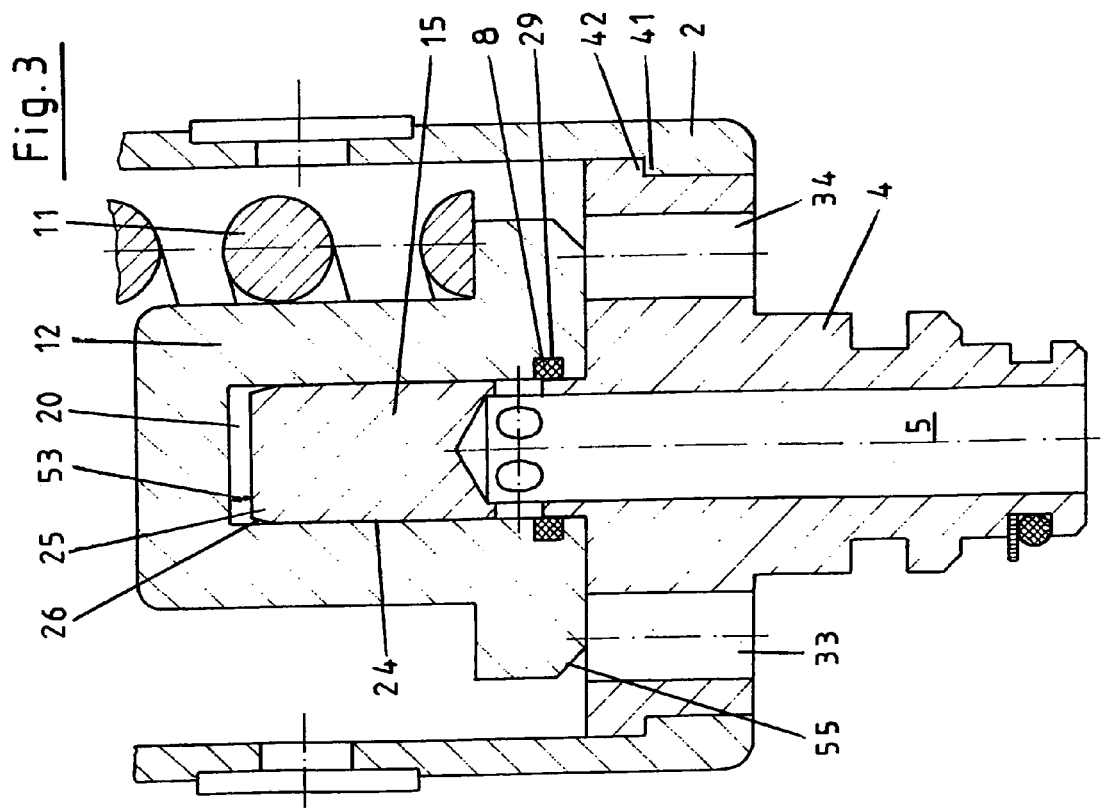

PRESSURE RELIEF VALVE WITH DIRECT HYDRAULIC DAMPING

This application claims the benefit of German Application No. 10 2004 005 745.1 filed Feb. 5, 2004.

German Application No. 10 2004 005 745.1 filed Feb. 5, 2004 is hereby incorporated by reference in its entirety.

BACKGROUND OF THE INVENTION

The invention relates to a pressure relief valve to protect hydraulic assemblies from damaging overload, in particular to protect the hydraulic brace system from pressure surges and other suddenly occurring overload, comprising a valve housing with a connection, wherein the input and output sides of the valve housing are separated from one another by means of a closing part, which can be displaced against the force of a valve spring and comprises a seal, and are connected to one another when an overload situation occurs to drain the hydraulic fluid.

Such pressure relief valves are known, for example, from DE 199 46 848 A1. Especially in underground hard coal mining, shield construction frames having one or more hydraulic props are used to secure the hollow space, wherein said props have to be protected from the above-mentioned overload with pressure relief valves. Said pressure relief valves are designed and built such that a valve piston that is arranged displaceably in a bore is pushed against the spring retainer, wherein it displaces the spring retainer against the force of the spring with sufficiently high overload and hereby crosses over a sealing ring until the radial bores it comprises establish a connection between the blind hole in the valve piston and the outlets so that the hydraulic fluid can drain and relieve the entire hydraulic assembly. When the overload has been decreased, the valve spring pushes the spring retainer and hence the valve piston back into its starting position, so that the system pressure prevails in the now closed blind hole without being able to influence other parts of the pressure relief valve. The illustrated embodiment in DE 199 46 848 A1 contains a double piston and between them a damping chamber, which is supplied with hydraulic fluid when the valve is opened as a consequence of the overload, and hereby additionally supports the movement of the spring retainer. When the pressure relief valve is being closed again, said damping chamber then ensures that the valve spring can return into the starting position only in a damped state. This is intended to prevent wobbling at the same time, which can occur especially during the opening and closing operations. The disadvantage, however, is that said pressure-balancing chamber in the pressure-balanced state of the pressure relief valve can become empty so that an even filling is not guaranteed upon actuation of the valve. In particular, this type of pressure relief valve can also lead to damage resulting from hydraulic self-destruction, however it is especially disadvantageous that several closing parts are used in order to achieve the above-described, even opening and closing operations of the pressure relief valve.

SUMMERY OF THE INVENTION

It is therefore the object of the invention to create a pressure relief valve, which has a simple design and which largely prevents the risk of hydraulic destruction.

The object is achieved pursuant to the invention in that the closing part is formed by a piston, which is linked to the connection, and the valve spring retainer, which comprises said piston, is arranged displaceably thereon and accordingly has a cylindrical design.

In this design of the pressure relief valve, movable parts can be completely eliminated in the area of the connection, i.e. especially the valve piston that is arranged displaceably in the bore. Instead, the valve spring retainer, which is still required, is designed such that it comprises the end piece of the connection, i.e. the piston connected thereto, and is displaced against the force of the valve spring when an overload occurs. It is furthermore beneficial that this embodiment results in a damping effect, guaranteed by the damping chamber, which is regularly filled with the system pressure developing when the pressure relief valve is opened without requiring the complete opening of the valve. This way, when closing the pressure relief valve again, it is guaranteed that a buffer consisting of hydraulic fluid is always available, which then has to be decreased by means of the spring before the complete closure of the pressure relief valve is achieved. It is especially beneficial that with this type of pressure relief valve only the valve spring retainer and the valve spring are moved, wherein the valve spring is in fact only tensed, and hence does not leave its position. It is furthermore beneficial that damping is guaranteed with the system pressure, so that it is also ensured that no wobbling or uneven movement can occur when closing the pressure relief valve, but also when opening it.

Pursuant to a useful embodiment of the invention it is provided that the piston and valve spring retainer comprise smooth contact surfaces that are provided and suitable for rod seals, so that the familiar O-rings and similar sealing rings can be used, the only difference being that here the seals are allocated not to the valve piston, but instead to the hat-shaped or cylindrical head section of the valve spring retainer. Additionally, in this manner a certain quantity of hydraulic fluid can travel past the contact surfaces and reach the area of the afore-mentioned damping chamber thus ensuring the described damping effect.

A particularly useful embodiment of the afore-mentioned piston is one in which the piston is part of the connection. The piston and connection hence form a unit, wherein the piston projects accordingly far beyond the connection base so that the cylindrical head section of the valve retainer can safely frame it.

As already mentioned above, the valve spring retainer comprises the piston that is allocated to the connection so that it can move purposefully and evenly when an overload occurs in order to prestress the valve spring. Said even guidance and beneficial embodiment is reached in particular when the valve spring retainer takes on a hat-shaped design, wherein the valve spring is supported by the hat rim, while the cylindrical head section of the valve spring retainer is shaped and arranged such that it frames the piston. The corresponding recess in the valve spring retainer can be represented by a blind hole or by corresponding shaping during the manufacture of the valve spring retainer. The piston representing a part of the connection can thus assume the aforementioned guiding function for the valve spring retainer, wherein its remaining functions are not impaired. Rather it is ensured that these additional functions, such as the separation of the inlet and outlet sides and others, can be fulfilled completely.

The hydraulic fluid is in the connection and pushes on the cylindrical head section of the valve spring retainer so that it has to move against the force of the valve spring. This process and the subsequent drainage of the hydraulic fluid past the valve spring retainer is enabled in particular by the fact that in the connection and piston a blind hole with radial bores on the end is incorporated as the inlet side, which during an overload situation are connected by lifting the valve spring retainer and passing over the seal with the outlet bores of the outlet side. Due to the fact that the overload hence acts upon the valve spring retainer via the blind hole and lifts said retainer, said retainer opens the radial bores forming the end of the blind hole such that the hydraulic fluid can reach the outlet bores via said hole, as directly as possible, and from there into the atmosphere. The connection with the allocated piston assumes an essential function of the valve piston known thus far, which is arranged displaceably in the valve bore, since it influences the valve spring retainer and at the same time ensures the path for the hydraulic fluid upon reaching a corresponding overload.

In order to ensure on one hand that the hydraulic fluid is applied fully to the valve spring retainer at the start of movement, and on the other hand that after a corresponding displacement path the hydraulic fluid can drain, it is provided that the seal is arranged in a groove, which is incorporated in the contact surface of the valve spring retainer at a distance from the base of the valve spring retainer, which guarantees a sufficiently large sealing ring surface beneath the radial bores on the piston. The seal is hence seated in a groove that secures it such that only a limited portion, namely the portion resting against the contact surface of the piston, is influenced by "friction". In this design the seal in the groove can also pass over the radial bores, whereupon it is pushed back into its starting position once the pressure relief valve has been relieved, wherein then a sufficiently large sealing ring surface is provided, which can ensure effective sealing. Secondly, the provided sealing ring surface is dimensioned such that a quick response of the pressure relief valve is possible, i.e, even after a relatively short displacement path, which is enabled by the special design of the valve spring. The spring safely responds in all areas, i.e. even after relatively brief tensioning, so that the seal in turn can have a sealing effect in the area of the contact surfaces during further displacement of the valve spring retainer.

Solutions are known in which the released hydraulic fluid exits the connection on the side or through the interior of the valve housing. The invention however considers it useful to design the outlet bores in the connection parallel to the blind hole in order to be able to specify an optimally short path for the hydraulic fluid. The hydraulic fluid is already uncovered by the seal when passing over the radial bores so that the hydraulic fluid can then be drained quickly through the outlet bores. In this it has proven especially useful to provide bores in the wall of the valve housing in addition to the outlet bores in the connection, or to use only the bores in the valve housing as outlet bores. Already the description clarifies that the hydraulic fluid can be drained, and hence the pressure in the system can be decreased, via the shortest possible path. Because here large amounts of hydraulic fluid have to be removed with the described valve in a short time, the design of bores and outlet bores will surely be the preferred one.

One embodiment of the invention that is beneficial in terms of its complexity provides that the blind hole is designed as a through-hole that continues up to the piston end, so that the hydraulic fluid can always be applied to the valve spring retainer, allowing it to be lifted quickly when an overload occurs. The system pressure hence acts fully upon the valve spring retainer so that said retainer lifts especially quickly and opens up the path to the outlet bores for the hydraulic fluid. Despite this design a kind of pressure chamber remains, even though it will empty partially when the pressure relief valve is closed again.

The design of the entire pressure relief valve is further simplified by equipping the valve housing on the nipple-side with a retaining projection, which is designed such that it pushes a corresponding lug on the connection from behind, and by arranging a rotatable spring adjusting screw on the opposite end of the valve housing. During assembly the valve housing is pushed from the connection side over said connection, then the valve spring that rests on the movable valve spring retainer is introduced, whereupon the valve spring and hence the remaining parts are evenly tightened with the spring adjusting screw. The spring adjusting screw can then also simultaneously be used to adjust the valve.

Another embodiment is one in which the valve housing, which is closed on the end, and the outer edge of the connection contain corresponding threads. By screwing the valve housing to the connection, the valve spring and the valve spring retainer are also tightened at the same time, wherein the valve housing also has to assume the function of the spring adjusting screw.

Due to the special circumstances in hard coal mining, the diameter of the props used becomes increasingly larger, especially in shield construction, so that the quantity of hydraulic fluid that needs to be drained constantly increases as well. The present invention further addresses these particular problems in that the blind hole in the connection has a diameter of 10 mm or more, so that hydraulic props having a piston diameter of 360 mm or more can be protected effectively via the pressure relief valves. Overall 800 l hydraulic fluid per minute can be removed, which enables a timely and prompt relief for such hydraulic assemblies.

The bores in the valve housing described above are protected from dirt since the outlet bores, especially the bores in the valve housing, are covered from the outside by a flexible sealing ring.

An especially effective and safely operating design of a damping chamber is provided pursuant to the invention and implemented in that the damping chamber, which is formed between the connection that contains a blind hole and radial bores and the displaceable closing part, is designed such that it has a direct connection with the blind hole and hence with the system pressure. In this way it is ensured that independent from the installation situation of the pressure relief valve, there is always a guarantee that the damping chamber is filled with hydraulic fluid already at the start of the opening process, in particular with the system pressure, so that no air bubbles or other impairments can develop. In this manner the valve is advantageously prevented from destroying itself hydraulically, so that not only can a longer service life can be achieved, but above all a fully effective and damped pressure relief valve is available at all times.

Furthermore it is beneficial and useful if the damping chamber is connected to the blind hole via a throttling port so that, when closing the pressure relief valve again and hence when the valve spring returns into its starting position, throttling is guaranteed, which in the end is dependent upon the diameter of the throttling port. This way specific damping can be achieved without requiring further controls and adjustments.

The availability of a correspondingly filled damping chamber and hence of a permanently active and ready-to-use pressure relief valve is achieved in particular in that the closing part is formed by a piston that represents a portion of the connection and a head section of the valve spring retainer, said section comprising the piston and taking on a correspondingly cylindrical design, wherein the throttling port is arranged in the piston and connects the deepest inside of the cylindrical valve retainer to the blind hole. Thus, during use of the pressure relief valve, the system pressure can always be applied to the damping chamber via the throttling port, or the damping chamber is always filled with accordingly pressurized hydraulic fluid. If then the situation arises in which the pressure relief valve opens due to an overload situation, further filling occurs via the throttling port, at least until the radial bores are completely clear and the hydraulic fluid can flow past the valve spring retainer to the outlet bores or holes. When closing the pressure relief valve again, the afore-mentioned throttling develops because the spring must first push the hydraulic fluid out of the damping chamber before the valve spring displaces the valve spring retainer accordingly.

Further above it was pointed out that the piston and the valve spring retainer comprise suitable smooth contact surfaces. Since the arrangement of the tightening seal and/or of the corresponding sealing ring is provided beneath the radial bores, the hydraulic fluid can also enter the space between the piston and valve spring retainer via the radial bores. A safe filling of the damping chamber is supported, however, by the fact that between the outer wall of the piston, between the radial bores and the piston tip, and the inner wall of the cylindrical head section another supply opening is incorporated for the direct supply of the damping chamber. Already the choice of words clarifies that this path also represents a direct connection between the damping chamber and the blind hole so that this path also offers the system pressure the possibility of applying an even effect on the damping chamber.

The insertion of the piston into the cylindrical head section of the valve spring retainer is facilitated in that the piston tip has a slightly tapered design so that no jamming can occur when inserting it into the corresponding opening of the head section.

A certain minimum size or starting size of the damping chamber is provided and adjusted in that the piston tip is designed to maintain a minimum distance to the deepest inside of the cylindrical head section, thus specifying the starting size of the damping chamber. This in turn forms a buffer again, which prevents contact of the individual parts because a certain buffer of hydraulic fluid is maintained at all times. Apart from this, the described supply paths always guarantee direct contact between the damping chamber and the hydraulic system fluid.

The even upward motion of the cylindrical head section of the valve spring retainer is purposefully supported pursuant to one embodiment in that the base of the valve retainer comprises a chamfer on the outer edge, while it is even in the remaining areas and ensures that the valve spring retainer rests securely on the connection. As soon as with this embodiment the hydraulic fluid has passed the radial bores and the first upward motion of the valve spring retainer has been reached, the hydraulic fluid draining through the tight gap pushes the valve spring retainer up, in particular due to the fact that an upward motion is specified and/or supported through the chamber.

The invention is characterized especially in that a simple and safely operating pressure relief valve is created, which involves direct hydraulic damping and which operates with only few moving parts. This reduction in moving parts alone leads to an improved response accuracy and hence an improved functioning of the pressure relief valve. Also the manufacture is facilitated because the connection can be equipped with a continuous axial bore or a blind hole, which no longer contains moving parts. Rather the piston, or better the piston part of the connection itself or of a corresponding partial region on which the correspondingly designed valve spring retainer can move, [is designed such] that it can prestress the spring accordingly, driven by the hydraulic fluid, and can connect the inlet side with the outlet side so that the hydraulic fluid peak can be reduced. Everything takes place evenly and quickly so that even with the specified dimensions large amounts, i.e. 800 l per minute or more, can be removed, thus preventing the damaging overload from having an unfavorable effect on the allocated hydraulic assembly. When closing the pressure relief valve again, the movement is controlled by the arrangement and configuration of the damping chamber such that no wobbling of the valve can arise, but rather an even detensing of the valve spring occurs, and hence a smooth, even and secure closing of the pressure relief valve.

Further details and benefits of the invention result from the following description of the attached drawings, which illustrate a preferred exemplary embodiment with the necessary details and individual parts. Shown are:

DETAILED DESCRIPTION OF THE PREFERRED EMBODIMENTS

Figure 1:
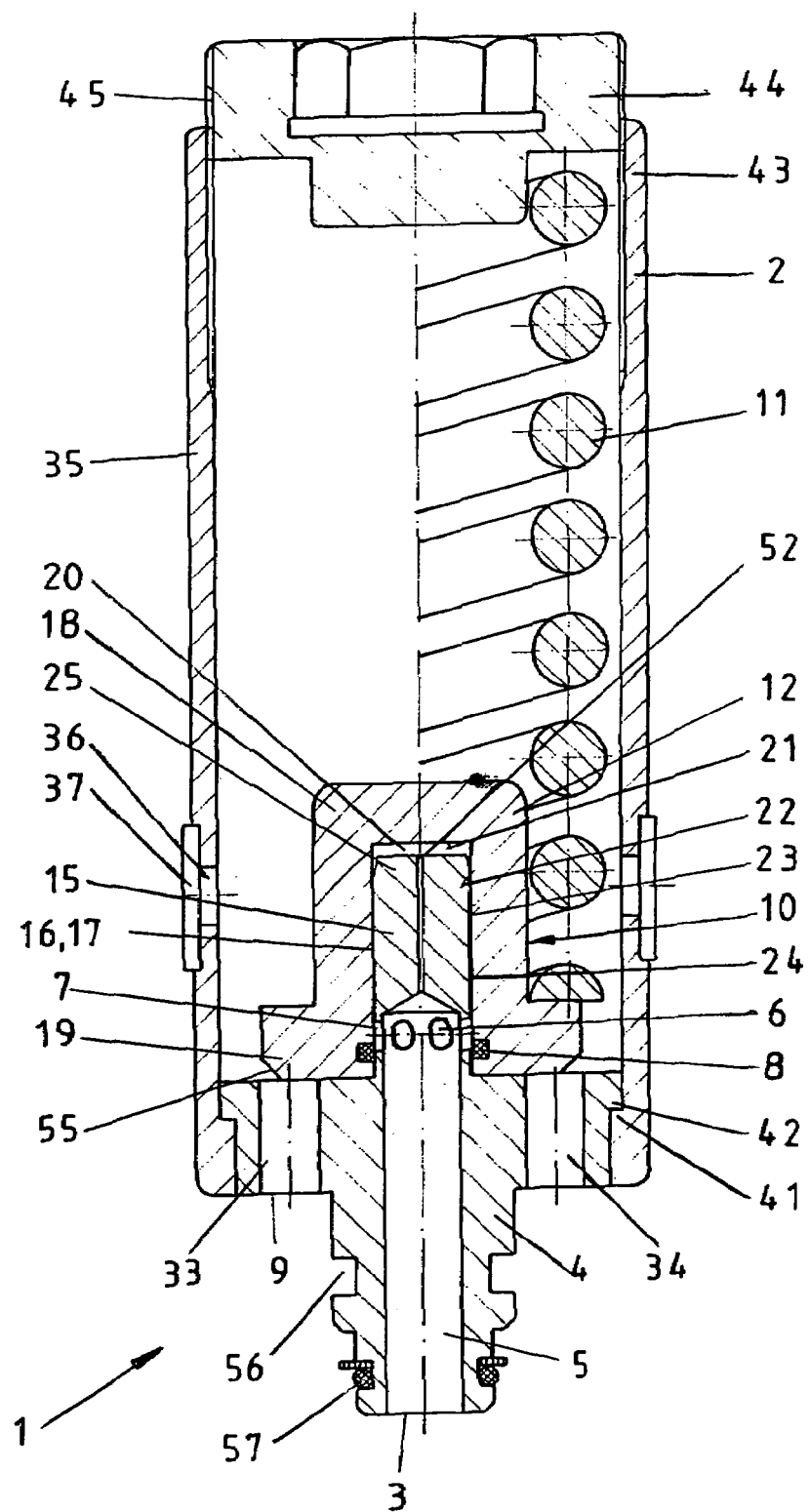
FIG. 1 a pressure relief valve in a sectional view with a spring adjusting screw, FIG. 2 a pressure relief valve, in a partial sectional view, with a continuous valve housing, FIG. 3 an enlarged illustration of the valve spring retainer and the piston in a sectional view, with a closed piston, FIG. 4 a sectional view of the pressure relief valve with a blind hole that also extends through the piston, and FIG. 5 an enlarged illustration of the sealing area between the valve spring retainer and the piston.

FIG. 1 shows a pressure relief valve 1 in a sectional view, wherein the valve housing 2 has the shape of a sleeve. In said valve housing 2 the valve spring 11 is accommodated with the valve spring retainer 12, wherein the specially shaped valve spring retainer 12, which is explained further below, is placed on the connection 4, specifically such that it is guided displaceably thereon. For this purpose the connection 4 contains a piston 15 as well as the sealing area between the stationary piston 15 and the movable valve spring retainer 12, which forms the so-called closing part 10. This closing part 10 closes the inlet side 3 of the valve housing 2 in relation to the outlet side 9 under normal circumstances. Only when a correspondingly high pressure exists in the area of the blind hole 5 of the connection 4, for example as a consequence of a pressure surge, does the hydraulic fluid push on the valve spring retainer 12 via the radial bores 6, 7 and the contact surfaces 16, 17 as well as the illustrated throttling port 52 and the damping chamber 20, so that said retainer is moved out of its position illustrated in FIG. 1 while pushing the valve spring 11 together. When passing over the seal, marked here with 8, the hydraulic fluid can then drain via the radial bores 6, 7 and flow to the outlet bores 33, 34 via the base 30 so that the system is relieved. In the case of FIG. 4, the radial bores 6, 7 are realized by the axially extending through-hole 40.

The valve spring retainer 12 contains a hat rim 19, which supports the valve spring 11, as well as a cylindrical head section 18, which encloses the piston 15. Both the piston 15 and the cylindrical head section 18 comprise contact surfaces 16, 17, which have such a smooth design that effective operation with the rod seal or the seal 8 is possible.

Figure 2:
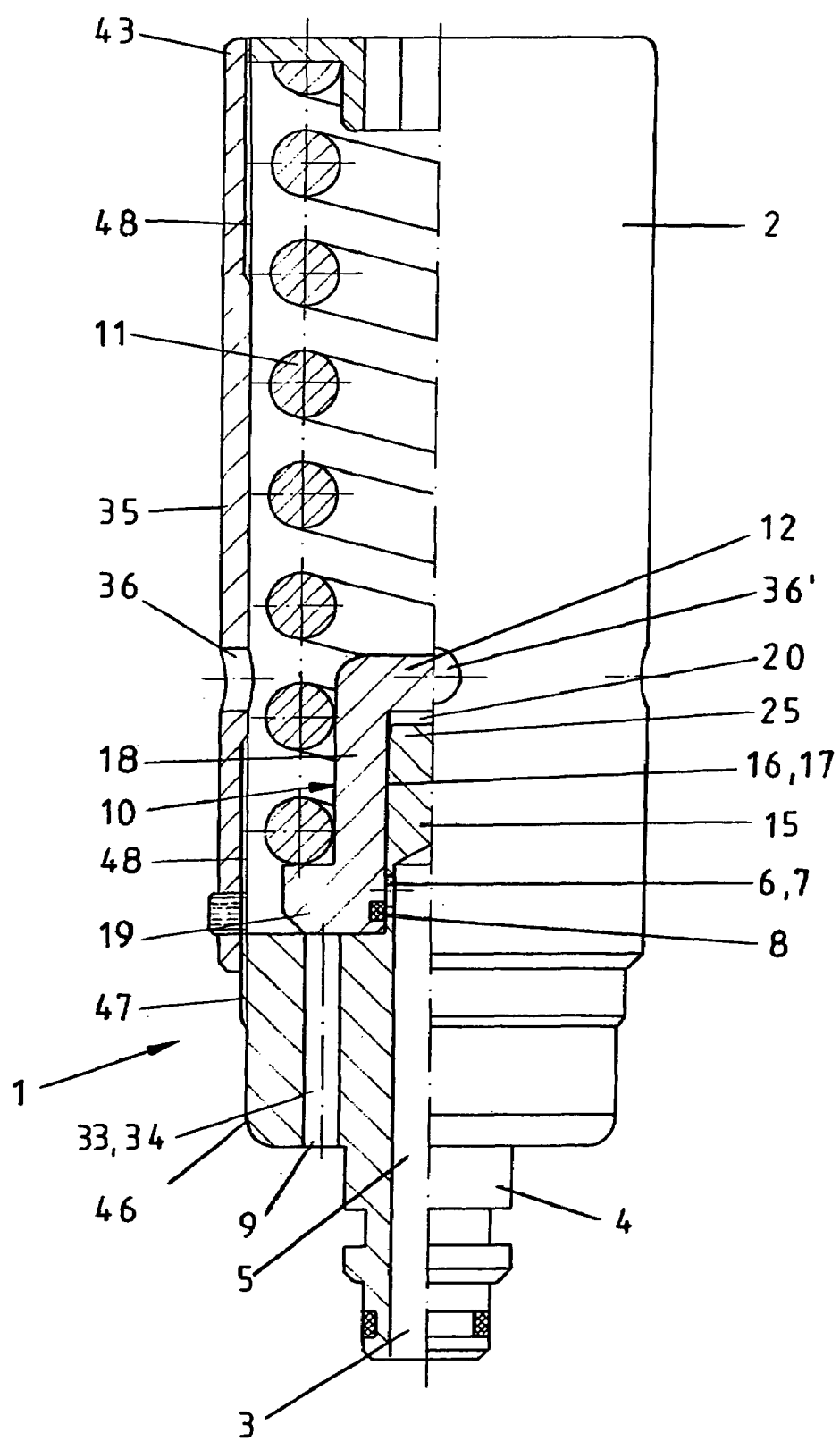

In the embodiment illustrated in FIG. 1 and also in FIG. 2, the hydraulic fluid present in the blind hole 5 can flow at system pressure level past the inner wall 22 and the outer wall 23, which specify a kind of supply opening 24, into the deepest inside 21, i.e. into the damping chamber 20. Said chamber is filled with hydraulic system fluid and remains under the influence of the system pressure during the entire normal operation of an allocated hydraulic assembly. To be able to insert the piston 15 better in the cylindrical head section 18, the piston tip 25 is equipped with chamfers 26, which can be seen especially in FIG. 3.

FIGS. 1, 3 and 4 differ with respect to the embodiment of the piston 15. In FIG. 1 said piston 15 comprises the above-mentioned throttling port 52, while pursuant to FIG. 3 it represents a block so that here the system pressure can be applied only between the inside wall 22 and the outside wall 23, i.e. through the supply opening 24, onto the damping chamber 20. In reverse, the damping then also takes effect in that—when pushing the valve spring 11 together and hence closing the pressure relief valve—the hydraulic fluid present in the damping chamber 20 must be drained again via said supply opening 24 so that a very high damping value is reached.

Pursuant to FIG. 4 then an embodiment is shown that results in only a low damping value since the hydraulic fluid enters via a blind hole 5 or the through-hole 40, which extends to the piston end 39 and leads directly to the damping chamber 20. When closing the pressure relief valve 1, the damping chamber 20 empties very quickly so that only a very limited damping effect is reached.

Figure 5:
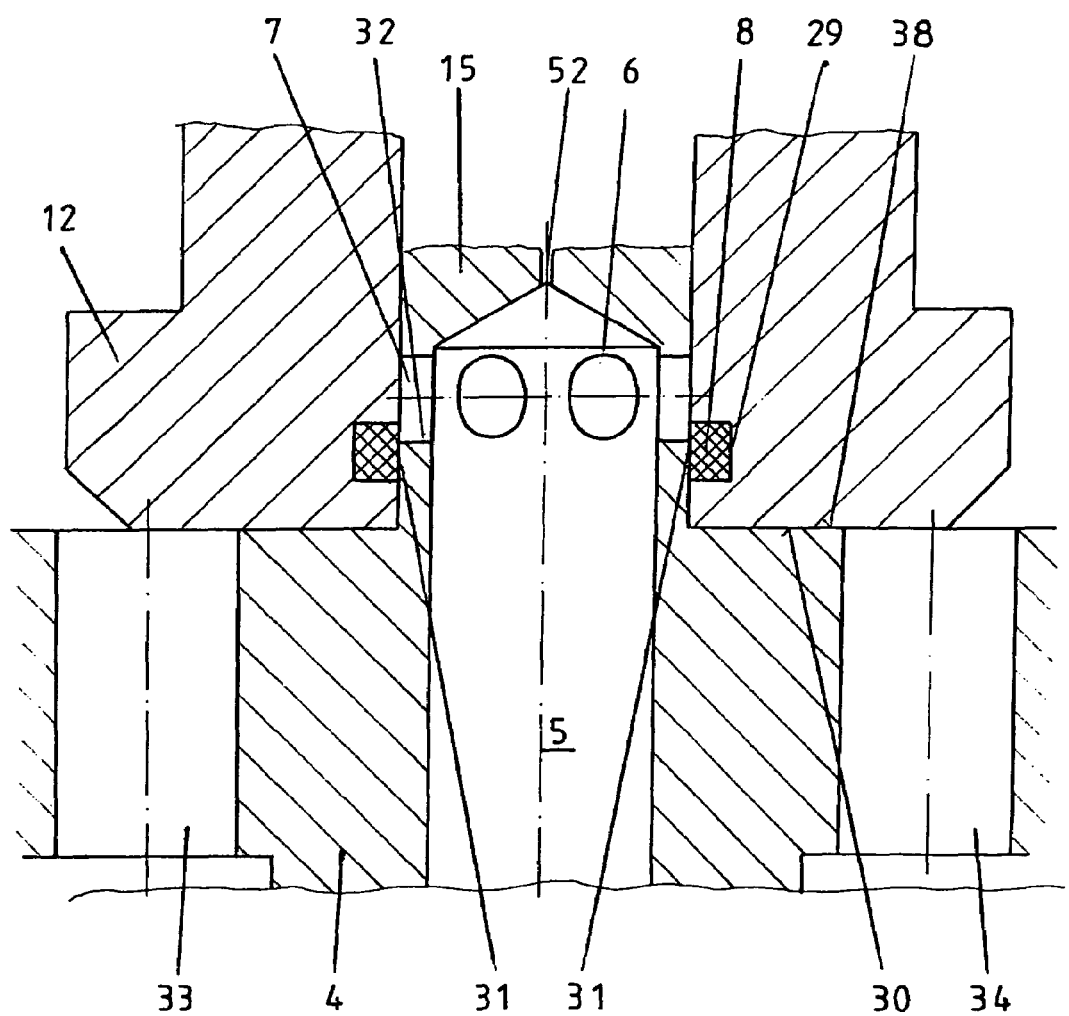

The aforementioned seal 8 is arranged in a groove 29 in the inside wall 22, specifically such that a sufficiently large sealing ring surface 31 is provided in the closed state of the pressure relief valve 1. In the enlarged representation pursuant to FIG. 5 it is shown that consciously a portion of the seal 8 projects beyond the edge 32 so that only a portion of the seal 8 is tight. Due to the special arrangement of the seal and/or its positioning as illustrated in FIG. 5 it is possible to push the seal against the sealing ring surface 31 with the hydraulic fluid such that an optimal seal is ensured at all times.

The path of the hydraulic fluid when opening the pressure relief valve 1 is described above. After passing the radial bores 6, 7 in the expanding gap between the base 30 of the cylindrical head section 8 and the top 38 of the connection 4 said hydraulic fluid reaches the outlet bores 33 34. Beyond that, further drainage of the hydraulic fluid can also be supported in that additional bores 36 are provided in the wall 35 of the valve housing 2. Said bores 36 are closed by means of a flexible sealing ring 37 in the embodiment shown in FIG. 1 so that hydraulic fluid cannot drain from the system even via this path until a corresponding overload arises in the inside of the valve housing 2.

The illustrations pursuant to FIG. 1 and FIG. 2 differ essentially only in that the valve housing 2 is connected differently to the connection 4. Pursuant to FIG. 1 the valve housing 2 is assigned a retaining projection 41 on the lower end, and the connection 4 is assigned a corresponding lug 42. This allows the valve housing 2 to be pushed across the connection until the retaining projection 41 and lug 42 become activated. On the opposite end 43 a spring adjusting screw 44 is provided, which upon insertion of the valve spring retainer 12 and introduction of the valve spring 11 can be loosened and tightened in order to specify the force that has to be overcome before the hydraulic fluid can be drained by opening the pressure relief valve 1.

Pursuant to FIG. 2 corresponding threads 47, 48 are incorporated both on the connection 4 on the outer edge 46 and on the valve housing 2 on the lower end, wherein the thread 48 is incorporated in the inside housing wall 49.

The spring adjusting screw 44 can incidentally be screwed into the valve housing 2 against the force of the valve spring 11 by means of the thread 45.

Above it has already been pointed out that the piston 15, which is part of the connection 4, can have different designs. In FIGS. 1 and 2 as well as in FIG. 5 the embodiment is shown in which a throttling port 52 establishes the direct contact between the damping chamber 20 and the blind hole 5. Here the piston 15 is designed such or so long that a minimum distance 53 pursuant to FIG. 3 is specified, which has also proven beneficial for the remaining examples.

The valve spring retainer 12 comprises on the end of the base 30 a chamfer 55, which provides for a targeted lifting action of the valve spring retainer 12. Said chamfer naturally will take effect especially when the bores 36 in the wall 35 of the valve housing 2 are used.

On the lower end the connection 4 comprises a sealing ring 57, enabling an effective connection to the hydraulic assembly that is supposed to be protected, wherein said connection is created by the plug-type connection 56. In the recesses of the connection 4 illustrated here a clamp, which is not shown, is inserted so that a connection to the hydraulic assembly is achieved easily and quickly.

All aforementioned features, also those disclosed only in the drawings, are considered essential for the invention, either alone or in combination with one another.

The invention claimed is:

1. Pressure relief valve for protecting hydraulic assemblies from damaging overload, comprising a valve housing with a connection, wherein the input and output sides of the valve housing are separated from one another by means of a closing part, which can be displaced against the force of a valve spring and comprises a seal, and are connected to one another when an overload situation occurs to drain the hydraulic fluid, wherein the closing part is formed by a piston linked to the connection and a valve spring retainer, which surrounds at least a portion of said piston, is arranged displaceably thereon and accordingly has a cylindrical design, wherein the seal is arranged in a groove, which is incorporated in the contact surface of the valve spring retainer at a distance to a base of the valve spring retainer, which guarantees a sufficiently large sealing ring surface beneath the radial bores on the piston.

2. Pressure relief valve pursuant to claim 1, wherein the piston and the valve spring retainer comprise smooth contact surfaces that are provided and suitable for rod seals.

3. Pressure relief valve pursuant claim 1, wherein the connection is a connection nipple, and the piston is part of the connection nipple.

4. Pressure relief valve pursuant to claim 1, wherein the valve spring retainer is hat-shaped, with a hat rim and a cylindrical head section, wherein the valve spring is supported by the hat rim, while the cylindrical, head section of the valve spring retainer is shaped and arranged such that it frames the piston.

5. Pressure relief valve pursuant to claim 4, wherein in the connection and piston a blind hole with radial bores on the end is incorporated as the inlet side, which during an overload situation are connected by lifting the valve spring retainer and passing over the seal with outlet bores of an outlet side.

6. Pressure relief valve pursuant to claim 5, wherein the outlet bores in the connection are designed parallel to the blind hole.

7. Pressure relief valve pursuant to claim 6, wherein bores are provided in a wall of the valve housing, in addition to the outlet bores in the connection, or in that only the bores in the valve housing are used as outlet bores.

8. Pressure relief valve pursuant to claim 5, wherein the blind hole is designed as a through-hole that extends to the piston end.

9. Pressure relief valve pursuant to claim 1, wherein the valve housing has a nipple side with a retaining projection, which is designed such that it pushes a corresponding lug on the connection from behind, and in that a rotatable spring adjusting screw is arranged on the opposite end of the valve housing.

10. Pressure relief valve pursuant to claim 1, wherein the valve housing, which is closed on one end, and the outer edge of the connection contain corresponding threads.

11. Pressure relief valve pursuant to claim 5, wherein the blind hole in the connection has a diameter of 10 mm or more.

12. Pressure relief valve pursuant to claim 5, wherein the outlet bores in the valve housing, are covered from the outside by a flexible sealing ring.

13. Pressure relief valve pursuant to claim 5, wherein between an outer wall of the piston, between the radial bores and a piston tip, and the inner wall of the cylindrical head section another supply opening is incorporated for direct supply of the damping chamber.

14. Pressure relief valve pursuant to claim 13, wherein the piston tip has a tapered design.

15. Pressure relief valve pursuant to claim 13, wherein the piston tip is designed to maintain a minimum distance to the deepest inside of the cylindrical head section, thus specifying the starting size of the damping chamber.

16. Pressure relief valve pursuant to claim 1, wherein a base of the valve retainer comprises a chamfer on its outer edge.

17. Pressure relief valve for protecting hydraulic assemblies from damaging overload, comprising a valve housing with a connection, wherein the input and output sides of the valve housing are separated from one another by means of a closing part, which can be displaced against the force of a valve spring and comprises a seal, and are connected to one another when an overload situation occurs to drain the hydraulic fluid, wherein the closing part is formed by a piston, linked to the connection, and a valve spring retainer, which surrounds at least a portion of said piston, is arranged displaceably thereon and accordingly has a cylindrical design, wherein the valve spring retainer is hat-shaped, with a hat rim and a cylindrical head section, wherein the valve spring is supported by the hat rim, while the cylindrical head section of the valve spring retainer is shaped and arranged such that it frames the piston, wherein in the connection and piston a blind hole with radial bores on the end is incorporated as the inlet side, which during an overload situation are connected by lifting the valve spring retainer and passing over the seal with outlet bores of an outlet side, and wherein the seal is arranged in a groove, which is incorporated in the contact surface of the valve spring retainer at a distance to a base of the valve spring retainer, which guarantees a sufficiently large sealing ring surface beneath the radial bores on the piston.

18. Pressure relief valve for protecting hydraulic assemblies during and after damaging overload, comprising a valve housing with a connection nipple, wherein the input and output sides are separated from one another by means of a closing part, which can be displaced against the force of a valve spring and comprises a seal, and are connected to one another when an overload situation occurs to drain the hydraulic fluid, wherein a damping chamber is provided between the input and output sides, wherein a damping chamber formed between the connection nipple that is equipped with a blind hole and radial bores and the displaceable closing part is designed such that it has a direct connection with the blind hole and hence with the system pressure, wherein the seal is arranged in a groove, which is incorporated in the contact surface of the valve spring retainer at a distance to a base of the valve spring retainer, which guarantees a sufficiently large sealing ring surface beneath the radial bores on the piston.

19. Pressure relief valve pursuant to claim 18, wherein the damping chamber is connected to the blind hole by means of a throttling port.

20. Pressure relief valve pursuant to claim 18, wherein the closing part is formed by a piston that represents part of the connection and a head section of the valve spring retainer, which surrounds at least a portion of said piston and accordingly has a cylindrical design, wherein the throttling port is arranged in the piston and conucets the deepest interior of the cylindrical valve retainer to the blind hole.

* * * * *